United States Patent [19]

MacLeod

[11] 4,436,056

[45] Mar. 13, 1984

[54] SPILL-RESISTANT PET ANIMAL DISH

[76] Inventor: Norman J. MacLeod, 730 Franklin Rd. K-1, Marietta, Ga. 30067

[21] Appl. No.: 399,458

[22] Filed: Jul. 19, 1982

[51] Int. Cl.³ .............................................. A01K 5/00
[52] U.S. Cl. ........................................ 119/72; 119/61
[58] Field of Search ............................... 119/61, 72, 63

[56] References Cited

U.S. PATENT DOCUMENTS

| | | | |
|---|---|---|---|
| 3,076,435 | 2/1963 | Seymour | 119/61 |
| 3,152,576 | 10/1964 | Faurot | 119/72 |
| 3,810,446 | 5/1974 | Kightlinger | 119/61 |
| 4,286,546 | 9/1981 | Moore | 119/61 |

FOREIGN PATENT DOCUMENTS 13793 of 1909 United Kingdom ................. 119/72

Primary Examiner—Jay N. Eskovitz
Attorney, Agent, or Firm—Harry I. Leon; V. L. Leon

[57] ABSTRACT

A spill-resistant animal watering container including a water holding dish or bowl having sloping sides in combination with a snap-in lid having a central aperture large enough to allow all sizes of animals access to the liquid in the bowl. The inner side wall and floor surrounding the bowl cavity are shaped so that the forces within a liquid moving within the bowl tend to neutralize each other.

9 Claims, 3 Drawing Figures

SPILL-RESISTANT PET ANIMAL DISH

BACKGROUND OF THE INVENTION

This invention relates in general to animal watering devices and, in particular, to animal watering dishes which prevent accidental splashing or spilling of the water when the animal is drinking.

More specifically, this invention relates to an improved animal watering container for traveling and home use. Because water can be made available for an animal at all times with this device, it is especially useful for traveling with pets.

The proper care of domestic animals, such as household pets, requires a supply of water of other liquid be available to the animals at various times during the day. All pet owners at some time or other travel with their pets or take trips to town for shopping in an automobile. Due to heat and humidity, pets require some type of liquid on these trips. Pets which are left in automobiles in the sun at shopping centers or other locations suffer less if they have something to drink. Some cities and states require by law that pets left in unattended vehicles have water or other liquid available at all times. Typically, this liquid is furnished in an open dish or bowl, thereby subjecting the pet owners to the annoyances of slopping or spilling the liquid from the bowl when the animal is drinking and making it impractical to have water available in an automobile. While these problems are generally considered annoyances, the liquid lying on the floor is often hazardous; and spillage on automotive carpets can cause deterioration of the carpet and rusting of the metal.

Various attempts to solve the spillage problem are shown in U.S. Pat. No. 3,076,435 for "Liquid Dispensing Receptable," U.S. Pat. No. 3,152,576 for "Anti-Splash Watering and Feeding Device for Pet Animals," and U.S. Pat. No. 4,286,546 for "Dog Watering Dish." While the devices disclosed in these patents reduce the amount spilled in most applications, not one has solve the problem of providing water for pets that travel in moving vehicles.

SUMMARY OF THE INVENTION

It is, therefore, an object of this invention to provide an improved animal watering device for the consumption of water by animals whether travelling or at home.

A further object of this invention is to prevent splashing of the contents of a container from which an animal is drinking.

Another object of this invention is to provide a container which has no-spill features for use in a vehicle in motion.

Another object of this invention is to provide a container with no-spill features in the event it is accidentally struck or kicked.

Still another object of this invention is to provide a watering container for use by animals of different sizes.

A still further object of this invention is to provide an uncomplicated watering device giving rise to manufacturing economy and simplicity in maintenance and use.

Another object of this invention is to provide a container which has eye appeal and resembles a pet dish in appearance.

These and other objects are attained in accordance with the present invention wherein there is provided an animal watering device comprising a liquid holding dish into which is placed a snap-in lid with a central aperture which is large enough to provide access for animals of different sizes to the contents of the dish. The snap-on lid prevents the natural splashing and spilling that occurs when an animal is drinking.

BRIEF DESCRIPTION OF THE DRAWINGS

Further objects of this invention, together with additional features contributing thereto and advantages accruing therefrom, will be apparent from the following description of the invention when read in conjunction with the following drawings wherein.

DESCRIPTION OF THE PREFERRED EMBODIMENT

Figure 1:
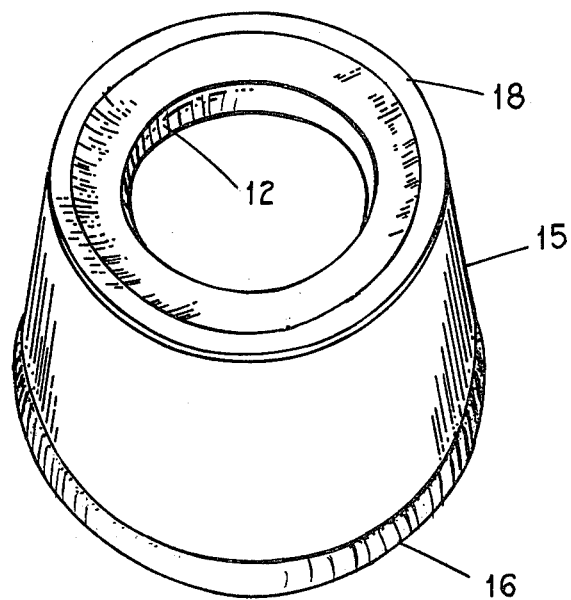
FIG. 1 is a perspective view showing an animal watering device incorporating the invention.
Figure 2:
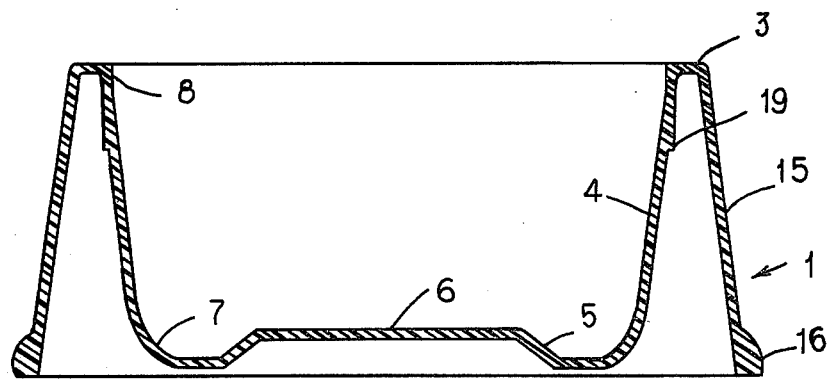
FIG. 2 is a vertical cross-sectional view of the bowl of the device shown in FIG. 1 on an enlarged scale.
Figure 3:
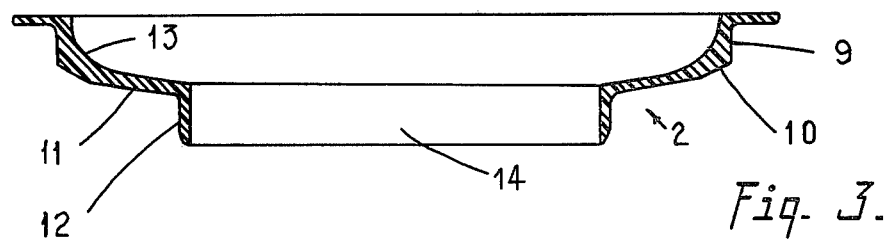
FIG. 3 is a vertical cross-sectional view of the snap-in lid of the device shown in FIG. 1 on a further enlarged scale.

In the drawings, there is shown a spill-resistant container incorporating the invention which comprises a bowl 1 and a closure such as a lid 2 which partially covers the opening of the bowl when the lid is fitted thereto. As shown in FIGS. 1 and 2, the central region of the lid 2 has an aperture 14 which is sufficiently wide to permit pet animals of all sizes access to liquid within the bowl, with the upper surface of the portion 13 of the lid contiguous the aperture being sloped to permit liquid which may drip from an animal's mouth to roll back into the bowl cavity.

The bowl 1 has a similar appearance to other pet dishes and is easily recognizable as such by pets and pet owners. The outer side wall 15 is disposed at an angle to the vertical. In the preferred embodiment shown in FIG. 2, a line formed in the plane which bisects the bowl 1 vertically and the outer surface of the side wall 15 is inclined at an angle of approximately 7°. A protrusion 16 having a radius of curvature of $\frac{1}{4}$ inch is provided at the base of the side wall 15 for better support and increased weight as well as a large contact area to aid in keeping the bowl stationary. The combination of the sloping side wall 15 and the protrusion 16 gives a rigid firm base with a wide stance to resist tipping. The outer side wall 15 is of sufficient height that substantial amounts of liquid can be carried in the bowl, thereby minimizing the need for frequent refilling.

The outer side wall 15 is molded together with an inner side wall 4 to a top section 3 of the bowl 1 to comprise a single unit. The top section 3 is contiguous a flange 18 of the lid 2 which extends to the outer peripheral edge of the section 3 (see FIG. 1). By providing a continuous flow of material, there are no sharp edges to cause injury to any animals.

A flat floor 6 near the bottom of the bowl 1 with the help of an inclined section 5 proximate thereto produces the necessary action of the liquid within the bowl cavity to develop undercurrents which create inner action within the liquid and force it down instead of up and out of the bowl. The curvature of the lower portion 7 of the inner side wall 4 forces the liquid to roll as it strikes the bottom and interacts with liquid from the floor 6 so that they neutralize each other.

The lid 2 is formed from a material having a resiliency which allows it to be snapped into the upper portion of the bowl 1 to form a tight fit to retain liquid.

A wall segment 8 extending from the upper edge of the inner side wall 4 of the bowl provides a surface for the lid 1 to abut against. In the embodiment shown in FIG. 2, the wall segment 8 is disposed so that points thereon are located approximately equidistant from an axis of symmetry passing through the bowl 1. The outside surface of a wall segment 9 of the lid has a shape which conforms to the shape of the inner surface of the wall segment 8 to create a tight fit, thereby resisting any liquid leaks. Moreover, a lid so formed provides easy access to the bowl cavity, thereby facilitating its cleaning.

A section 10 proximate the bottom of the lid 2 has a flat surface disposed at an angle to stop the rolling action of the liquid and slow down its movement within the bowl. As a liquid rolls from the section 10, it slides down the less steeply inclined wall 11 and strikes the the inner flange 13, which in turn forces the liquid to fall toward the bottom of the bowl cavity and retains the liquid therein, further enhancing the non-spillage capabilities of this invention.

As illustrated in FIG. 2, a flange 19 is preferably disposed on the surface of the inner side wall 4 which is proximate the outer side wall 15 to provide means for preventing sticking when more than one bowl 1 is stacked upon another.

While the invention has been described with reference to a preferred ambodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spill-resistant container for an animal which comprises:
   (a) a bowl and lid therefor, the lid having an aperture to permit access by the animal to liquid within the bowl; a segment of the lid having an outside shape to conform to a portion of the interior surface of the bowl; the lid having a wall section which extends generally inward and downward from the lower edge of said segment, the wall section being adapted to change the direction of a liquid advancing generally upward along the interior surface of the bowl and to direct it away from the aperture; and
   (b) the bowl having a floor elevated above the lowermost portion of said interior surface and an inclined section, the upper surface of which extends generally outward and downward from the outer periphery of the floor, so that the lower portion of the bowl forms a depression surrounding the floor, the inclined section being adapted to create undercurrents within the liquid as it is being moved to oppose any forces tending to push it upward along the interior surface of the bowl.

2. A spill-resistant container according to claim 1 wherein the interior surface of the bowl is further characterized as having a transition region disposed between the lowermost portion of the bowl and a generally vertical portion of its interior surface, a line formed by the intersection of a vertical plane with the interior surface in the transition region being a continuous smooth curve, the interior surface in the transition region being adapted to force a liquid to roll as it reaches the lowermost portion of bowl and interacts with the liquid from the floor, thereby tending to neutralize forces acting upon the liquid.

3. A spill-resistant container according to claim 1 wherein the lid further comprises a flange which extends generally outward from the upper edge of said segment of the lid and which abuts the uppermost surface of the bowl when the lid is seated in the bowl and wherein the upper surface of a portion of the lid contiguous the aperture is sloped generally downward, said portion of the lid extending generally inward from the upper edge of said segment of the lid to facilitate the drainage into the bowl of liquid which may drip from an animal's mouth onto the lid.

4. A spill-resistant container according to claim 1 wherein the bowl further comprises an outer side wall having a substantially frusto-conical shape, the diameter of which is greater at the base of the outer side wall than at its upper edge, points on the outer side wall being lowermost on the bowl so that it has a wide stance to resist tipping.

5. A spill-resistant container according to claim 4 wherein the outer side wall further comprises a protrusion disposed along the entire length of the base of the outer side wall, the protrusion and the outer side wall comprising a single, unitary piece to add rigidity to the side wall and to increase the contact area between the bowl and a surface upon which its rests.

6. A spill-resistant container for holding liquid for an animal which comprises:
   (a) a bowl and a lid therefor, the lid having an aperture to permit access by the animal to liquid within the bowl, the lid having a wall section which extends generally inward and downward from a portion of the lid which is contiguous the interior surface of the the bowl when the lid is seated therein, the wall section being adapted to change the direction of a liquid advancing generally upward along said interior surface and to direct the liquid away from the aperture; and
   (b) the bowl having a floor elevated above the lowermost portion of said interior surface and an inclined section, the upper surface of which extends generally outward and downward from the outer periphery of the floor, the inclined section being adapted to create undercurrents within the liquid as it is being moved to oppose any forces tending to push it upward; the interior surface of the bowl having a transition region extending generally upward from the lowermost portion of the bowl, a line formed by the intersection of a vertical plane with the interior surface of the bowl in the transition region being a continuous smooth curve, the interior surface in the transition region being adapted to force a liquid to roll as it strikes the lowermost portion of the bowl and interacts with liquid from the floor.

7. A spill-resistant container according to claim 6 wherein said portion of the lid is formed of a resilient material and has an outside shape which conforms to the interior surface of the bowl contiguous said portion when the lid is fitted to the bowl, the lid being centered with respect to the bowl when said portion of the lid is seated therein, thereby creating a water-tight seal between the bowl and the lid.

8. A spill-resistant container according to claim 7 wherein the lid further comprises a flange which extends generally outward from the upper edge of said portion of the lid and which abuts the uppermost surface of the bowl when the lid is seated therein and wherein said portion of the lid is further characterized as having an upper surface which slopes generally inward and downward towards the aperture to facilitate the drainage into the bowl of liquid which may drip from an animal's mouth onto the lid.

9. A spill-resistant container according to claim 6 wherein the bowl further comprises an outer side wall having a substantially frusto-conical shape, the diameter of which is greater at the base of the outer side wall than at its upper edge, points on the outer side wall being lowermost on the bowl, so that it has a wide stance to resist tipping; the outer side wall having a protrusion disposed along the entire length of the base of the outer side wall, the protrusion and the outer side wall comprising a single, unitary piece to add rigidity to the side wall and to increase the contact area between the bowl and a surface upon which it rests.

* * * * *